United States Patent [19]

Bubik

[11] Patent Number: 4,795,303

[45] Date of Patent: Jan. 3, 1989

[54] VEHICLE TRANSPORTING APPARATUS

[75] Inventor: Leslie Bubik, Toronto, Canada

[73] Assignee: Vulcan Equipment Company, Ontario, Canada

[21] Appl. No.: 55,378

[22] Filed: May 29, 1987

[51] Int. Cl.⁴ .............................................. B60J 9/00
[52] U.S. Cl. .................... 414/478; 414/563; 414/480; 414/500; 414/471; 280/402; 298/14; 410/15; 410/29.1
[58] Field of Search ............... 414/469, 475, 477, 478, 414/479, 480, 482, 483, 498, 500, 563, 471; 280/402; 410/4, 7, 13, 14, 15, 24, 26, 29.1, 25; 298/12, 14

[56] References Cited

U.S. PATENT DOCUMENTS

| | | | |
|---|---|---|---|
| 3,951,280 | 4/1976 | Peck | 414/563 |
| 4,239,275 | 12/1980 | Horneys et al. | 410/26 X |
| 4,318,657 | 3/1982 | Znidaric | 414/563 X |
| 4,456,420 | 6/1984 | Newhard | 414/478 |

FOREIGN PATENT DOCUMENTS

| | | | |
|---|---|---|---|
| 3003265 | 8/1981 | Fed. Rep. of Germany | 414/477 |
| 3124752 | 1/1983 | Fed. Rep. of Germany | 414/480 |
| 3244244 | 7/1983 | Fed. Rep. of Germany | 414/480 |
| 1230886 | 5/1986 | U.S.S.R. | 414/500 |
| 964936 | 7/1964 | United Kingdom | 298/14 |

*Primary Examiner*—Frank E. Werner
*Attorney, Agent, or Firm*—Niro, Scavone, Haller, Niro & Rockey, Ltd.

[57] ABSTRACT

A vehicle transporting apparatus of the car carrier variety is provided with a platform that is pivotally mounted to the chassis of the transporting vehicle at a location forward of the centerline of the vehicle's rear wheels and above the chassis. A powered actuator is employed for pivotally moving the platform to either forwardly inclined or rearwardly inclined positions. A rearwardly projecting wheel lift boom is also pivotally mounted to the chassis below the platform and is capable of supporting a vehicle to be transported at least partially beneath the platform.

8 Claims, 3 Drawing Sheets

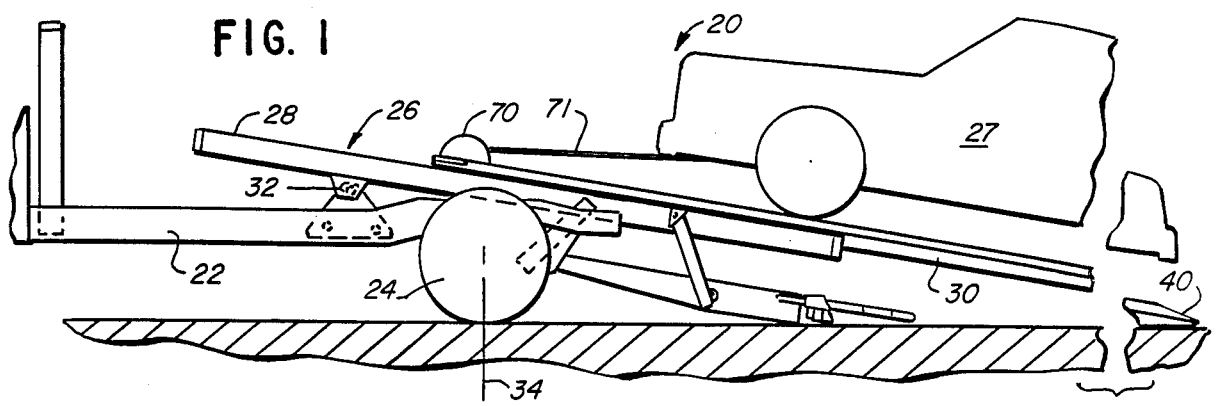
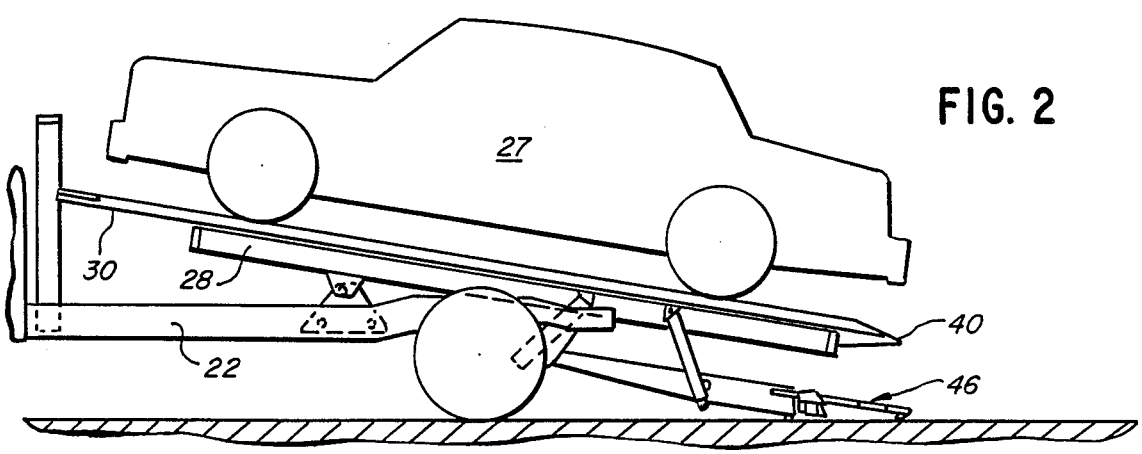
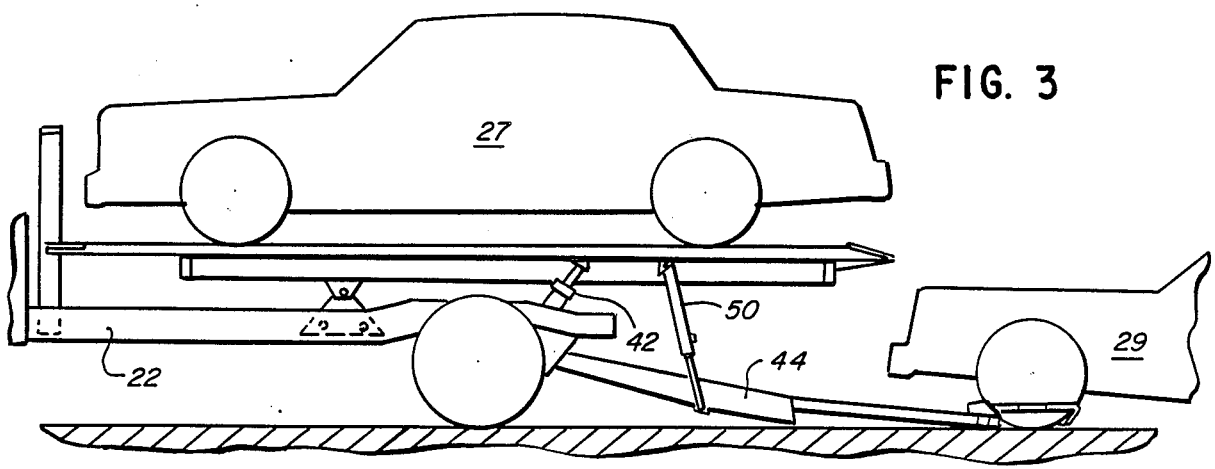
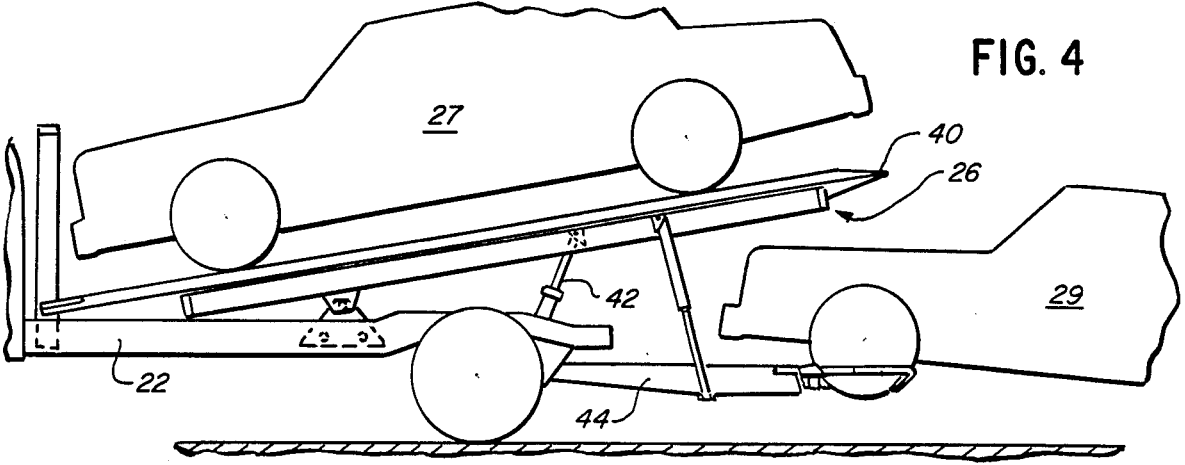

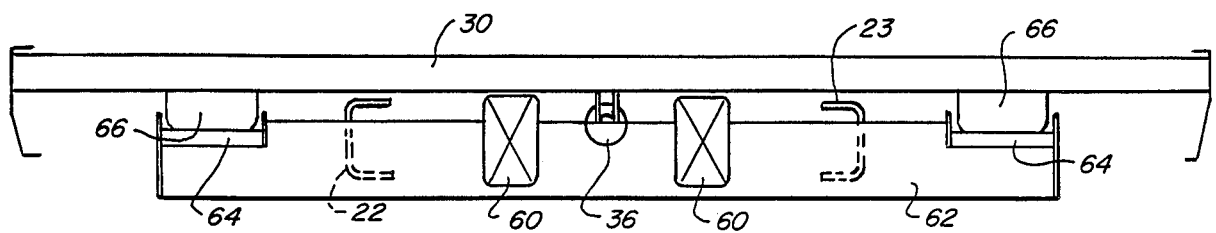
FIG. 7
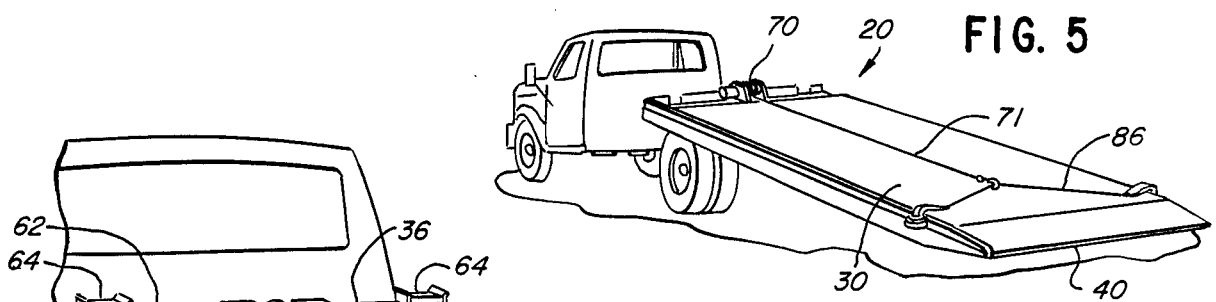
FIG. 5
FIG. 6
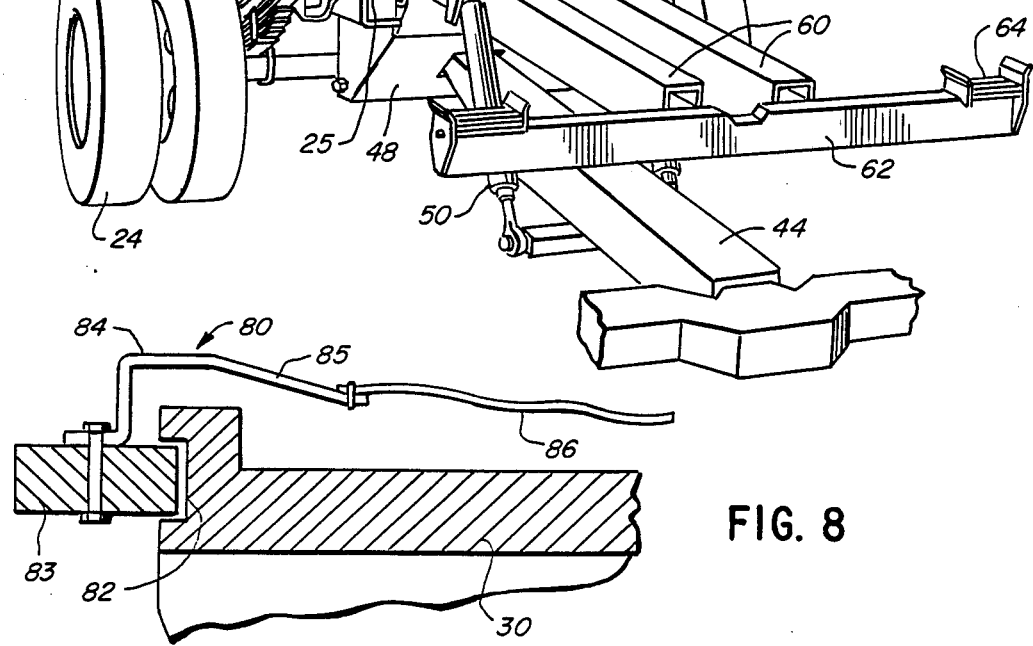
FIG. 8

VEHICLE TRANSPORTING APPARATUS

The present invention relates to apparatus for transporting a vehicle and, more particularly, to a "car carrier" which is capable of transporting one or more vehicles in a damage-free manner.

In recent years, there has been a growing interest in the towing industry for vehicle transporting equipment that is versatile in use and capable of carrying a vehicle without risk of damage. As a result, a specific class of equipment, known as car carriers, has become increasingly popular. Such equipment typically includes a platform or deck carried on a truck chassis. The deck is capable of movement from a generally horizontal transport position, over the rear wheels of the truck, to a loading position in which the deck extends rearwardly from the truck chassis and downwardly inclined to the ground. In this latter loading position, the deck forms a ramp on which the vehicle to be towed is placed, either by driving it under it own power, by winching, or other conventional techniques. Examples of such prior art car carriers are shown in U.S. Pat. Nos. 3,450,282; 4,239,275; 4,368,002 and 4,556,357.

There are several disadvantages associated with known prior art car carriers. For example, in many prior art units, the deck is pivotally mounted at or near the rearmost extension of the chassis and is actuated by a hydraulic cylinder located at the forward end of the deck. This arrangement shortens the effective ramp length from ground level to deck level. As a result, the ramp angle, that is the angle between the deck in the loading position and the ground, is relatively large. A large ramp angle poses a serious problem since today's low-profile automobiles can be easily damaged if the ramp rises too abruptly from ground level.

Another problem associated with prior art car carriers is that the deck can be moved only down from its horizontal transport position. Thus, the rearmost extension of the deck cannot be raised. This functional limitation is a disadvantage for at least two reasons. First, vertical movement of the deck above horizontal facilitates use of the carrier for dock work, thus making the equipment more versatile. Second, upward vertical movement permits the unique combination of the deck carrier together with a rear boom wheel lift to enable safe and efficient transport of two vehicles simultaneously.

A still further disadvantage encountered with prior art car carriers is that no effective means has been provided to assist in loading vehicles whose rolling wheels are offset. Thus, when a damaged vehicle with offset wheels is winched onto the inclined deck, it has a tendency to move laterally, and it is often difficult to properly position the vehicle in the center of the deck.

SUMMARY OF THE INVENTION

The present invention is directed to a uniquely constructed vehicle transporting apparatus that overcomes several of the disadvantages associated with prior art car carriers. Thus, the present invention embraces a vehicle transporting apparatus having a movable deck which is pivotally mounted and actuated by an arrangement which minimizes the ramp angle between the deck and the ground while in the loading position. Moreover, the apparatus of the present invention permits movement of the rearmost extension of the deck both up and down from its location with the deck in its horizontal transport position. As a result, the vehicle transporting apparatus of the present invention provides damage-free operation and is more versatile than known prior art car carriers. Moreover, these advantages are achieved by means of a relatively simple, cost effective and reliable design.

In accordance with one embodiment of the invention, a vehicle transporting apparatus is comprised of a chassis movably supported by at least two rear wheels, a platform for carrying a vehicle and having an extensible and retractable deck, means located forwardly of the center line of the rear wheels for pivotally mounting the platform to the chassis and power operated means for pivotally moving the platform relative to the chassis.

By strategically locating the pivotal mounting means at a point forward of the rear wheel center line, the ramp angle is reduced. Moreover, by locating the power operated means at a point behind the rear wheels and below the platform, the movement of the deck both up and down from its horizontal orientation is effected easily and inexpensively.

In accordance with another embodiment of the invention, a rearwardly projecting boom is also pivotally mounted to the chassis below the platform. This boom carries wheel engaging means for lifting and towing another vehicle behind the car carrier. The boom is also mechanically tied to the pivotable platform so that movement of the platform will also result in movement of the boom to raise or lower the vehicle being towed.

It is, therefore, an object of the present invention to provide a vehicle transporting apparatus capable of achieving a lower ramp angle than with prior art devices.

It is another object of the present invention to provide an apparatus capable of safely transporting two vehicles simultaneously.

It is still another object of the present invention to provide a vehicle transporting apparatus that is more versatile due to the enhanced vertical movement capability of its platform or deck.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

FIG. 1 is a side elevation showing the vehicle transporting apparatus of the present invention in the vehicle loading position;

FIG. 2 is a side elevation of the apparatus of FIG. 1 illustrating the retraction of the deck from the vehicle loading position;

FIG. 3 is also a side elevational view showing the apparatus of the present invention with its boom extended and engaging the wheels of a vehicle to be towed;

FIG. 4 is a side elevational view illustrating the apparatus of the present invention in its transport position when used to transport two vehicles simultaneously;

FIG. 5 is a perspective view showing the apparatus of the present invention in vehicle loading position with its associated winch and guide means;

FIG. 6 is a perspective view of the apparatus of the present invention with its platform removed to illustrate more clearly certain internal structural details of the invention;

FIG. 7 is a cross-sectional view illustrating the positional relationship between the platform and the truck chassis when the apparatus of the present invention is in the loading position;

FIG. 8 is an enlarged cross-sectional view showing one embodiment of the guide means used in accordance with the present invention.

DETAILED DESCRIPTION OF THE INVENTION

Figure 9:
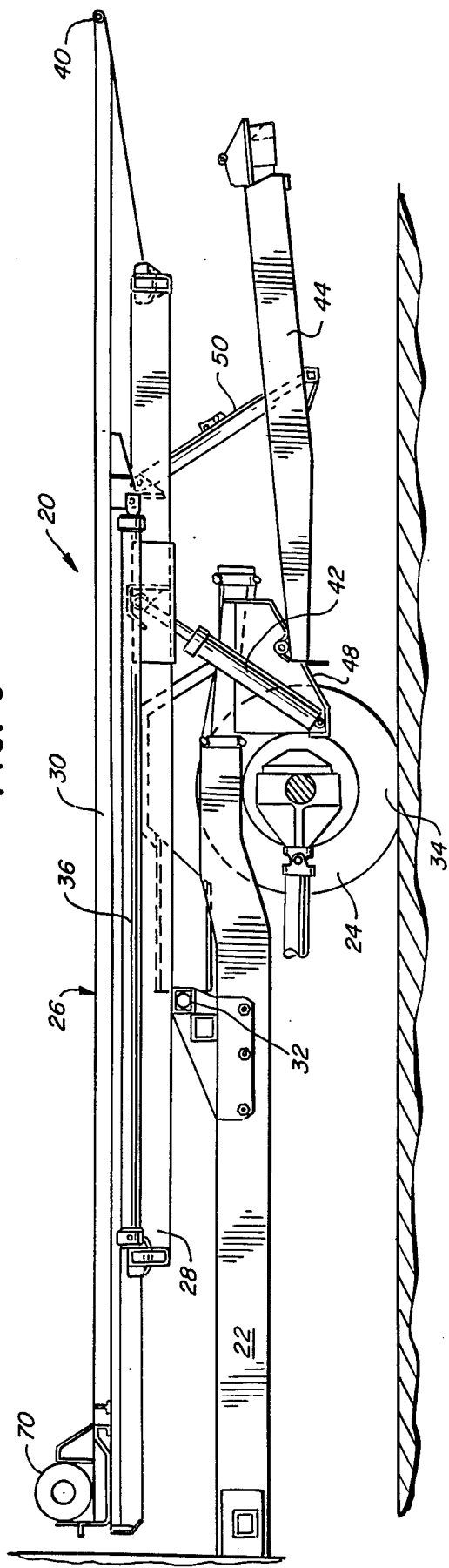
FIG. 9 is a side elevation showing the vehicle transporting apparatus of the present invention in a generally horizontal, one-vehicle transport position.
Figure 10:
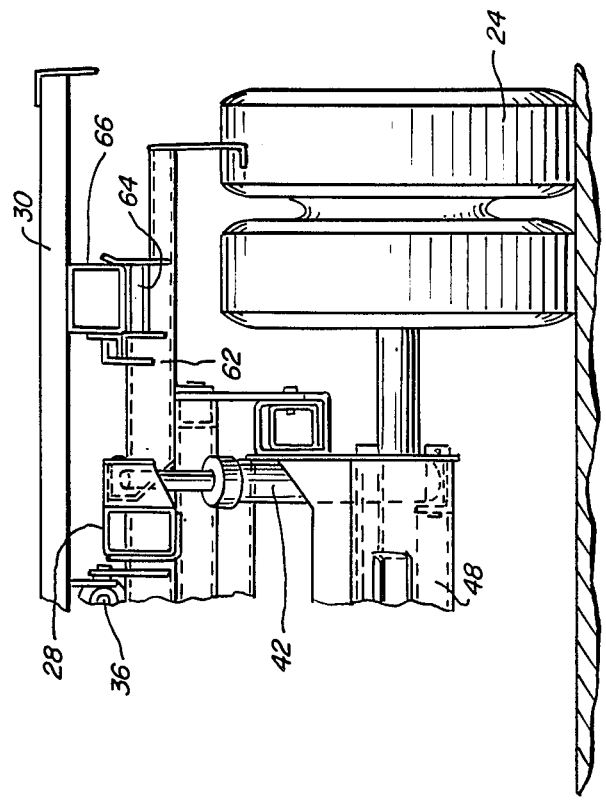
FIG. 10 is a right-half end view of the apparatus as illustrated in FIG. 9 but with the lower, extensible boom removed.

With reference to the drawings and particularly FIGS. 1, 5 and 9, a vehicle transporting apparatus, designated generally as 20, is shown and includes a chassis 22, rear wheels 24 to support the chassis, and platform means 26 for carrying a vehicle 27. The platform means includes a support member 28 and deck 30 which are interconnected with the chassis 22 and one another in such a manner to permit movement between several different operating positions. Specifically, the support member 28 of the platform means is mounted to chassis 22 by pivotal mounting means 32 which is located at a position forward of the center line 34 of rear wheels 24 and above the chassis 22. The deck 30, in turn, rests on and slidably engages support member 28 and may be extended from or retracted onto the chassis 22 by means of a hydraulic deck actuator 36. In accordance with the present invention, the platform means 26 may be pivoted about mounting means 32 such that the deck 30 may be inclined rearwardly, as shown in FIGS. 1 and 2, or inclined forwardly, as shown in FIGS. 3 and 4. As a result, the rearmost extension 40 of deck 30 travels through a vertical arc from a point below horizontal, at ground level for example, to a point above horizontal as shown in FIG. 4. The platform means is pivotally moved in this described fashion by a powered platform actuator, such as hydraulic cylinder 42.

The apparatus of the present invention also includes a rearwardly projecting, extensible and retractable boom 44 which includes means 46 for engaging the wheels of another vehicle 29 to be transported. The boom 44 is pivotally mounted to chassis 22 via bracket 48 located below platform means 26 and is mechanically connected to the platform means by a retainer, such as tie member 50. In this way, the boom 44 can be raised or lowered with the platform means. The wheel engaging means 46 may be constructed in any of a variety of designs well known to those skilled in the art. One particularly preferred construction is that shown in U.S. Pat. No. 4,637,623, the disclosure of which is incorporated herein by reference.

As more clearly shown in FIGS. 6 and 7, the support member 28 preferably includes two longitudinal channels 60 having lateral beams 62 terminating in upwardly facing bearings 64. These bearings are preferably constructed from pads of low friction material, such as virgin or glass filled Teflon. ® Deck 30 is also preferably constructed with a pair of laterally spaced support rails 66 that slide on bearings 64. In order to assure proper alignment between the bottom surfaces of rails 66 and bearings 64, the bearings are preferably mounted in rocker assemblies that provide self-alignment. These rocker assemblies may employ any conventional design well known to those skilled in the art. As is most clearly seen in FIG. 7, the platform means 26 is constructed so that its lower components such as channels 60 telescope between and below the upper most surfaces 23 of chassis 22 at the rearmost extension 25 of the chassis. This further contributes to the low ramp angle achieved with the apparatus of the present invention.

The operation of the apparatus constructed as described above is simple and straightforward. By actuation of cylinders 36 and 42 the deck may be rearwardly extended and pivoted to a rearwardly inclined, loading position with the rearmost extension 40 of deck 30 at ground level. Vehicle 27 may then be driven onto the inclined deck. Alternatively, if the vehicle is disabled, winch means 70 may be employed to pull the vehicle onto the deck. Once the vehicle is properly positioned, cylinders 36 and 42 are again actuated to retract the deck and then pivot the platform upwardly to the transport position. When only a single vehicle is being transported the platform means 26 will be maintained generally horizontally for transport purposes. However, when a second vehicle is to be transported, the cylinder 42 is extended further to position the platform means in a forwardly inclined orientation shown in FIG. 3. With tie rod 50 fully extended, the boom 44 will be located at ground level and the wheels of the second vehicle may then be engaged by the boom in the conventional manner. Once properly engaged, the boom is retracted and the platform means and boom are raised as shown in FIG. 4. By virtue of the unique construction of the present invention, the second vehicle 29 may be positioned partially beneath the rearward extension 40 of deck 30, thereby minimizing the distance between the effective loading force of the second vehicle and the centerline 34 of the rear wheels. As those skilled in the art will appreciate, this is a significant advantage over prior art devices since it reduces the tendency of the front wheels to lift from the road surface when towing a second vehicle.

FIGS. 5 and 8 illustrate another novel feature of the present invention—a guide means to properly center a vehicle on deck 30. This guide means is used primarily when the vehicle has been damaged or its wheels are locked in a position that will not permit self-steering. The guide means includes two carriages 80 that ride in longitudinally extending tracks 82 on opposite sides of deck 30. Each carriage includes a roller 83 and bracket 84, with the free end 85 of the bracket secured to a strap 86. Each strap, in turn, is connected with winch line 71 of winch means 70. The vehicle is then chained or strapped on each side to carriages 80 and will be automatically centered on deck 30 as the winch line is reeled in.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An apparatus for transporting one or more vehicles, comprising:

a chassis;

a platform pivotally mounted to said chassis and including an extensible and retractable deck for carrying a first vehicle; said platform being pivotable through an arc so that said platform may be selectively inclined either rearwardly or forwardly;

an extensible and retractable boom pivotally mounted to said chassis below said platform and having a free end for engaging a pair of wheels of a second vehicle;

power operated means for pivotally moving said platform and said boom on said chassis; and an extensible and retractable retainer means for selectively maintaining said boom and platform in variable spaced relation;

whereby upon forwardly inclining said platform and retracting said boom, said platform is spaced a sufficient distance above said boom to permit said second vehicle when carried by said boom to be positioned partially beneath said platform.

2. The vehicle transporting apparatus of claim 1 further comprising a plurality of wheels for movably supporting said chassis, including at least two rear wheels; and wherein said chassis includes frame members having upper surfaces and terminates at ends located rearward of the center point of said rear wheels; and said platform includes a longitudinally extending support member positionable below the upper surfaces of said chassis frame members when said platform means is moved to a rearwardly inclined position.

3. The vehicle transporting apparatus of claim 1 wherein said power operated means is connected to said platform at a location rearward of the center point of said rear wheels.

4. The vehicle transporting apparatus of claim 1 wherein said support member is connected to a plurality of lateral beams each carrying bearing pads at opposing ends, and wherein said deck includes laterally spaced support rails slidably engaging said bearing pads.

5. The vehicle transporting apparatus of claim 4 wherein at least each of the rearward most pair of bearing pads is mounted in a rocker assembly.

6. The vehicle transporting apparatus of claim 1 further including winch means for positioning a vehicle on said deck, said winch means including guide means for laterally centering said vehicle on said deck.

7. The vehicle transporting apparatus of claim 6 wherein said guide means includes longitudinal slots along each side of the deck, a winch trolley associated with each said slot and connected to said winch means, and a winch line operatively connected to each said winch trolley and for attachment to said vehicle.

8. The vehicle transporting apparatus of claim 1 further comprising a plurality of wheels for movably supporting said chassis, including at least one pair of rear wheels on a common axle; means located on said chassis at a fixed position forward of the center point of said rear wheels for pivotally mounting said platform to said chassis; and wherein said power operated means is connected to said chassis and to said platform at a location rearward of the center point of said rear wheels.

* * * * *